E. J. BALCEAR, OF MARTINEZ, ASSIGNOR TO SAMUEL PILLSBURY, OF SAN FRANCISCO, CALIFORNIA.

Letters Patent No. 90,064, dated May 18, 1869.

IMPROVED CLEANSING-LIQUID.

The Schedule referred to in these Letters Patent and making part of the same.

*To all whom it may concern:*

Be it known that I, E. J. BALCEAR, of Martinez, county of Contra Costa, and State of California, have invented or discovered a new and useful Cleansing-Fluid; and I do hereby declare that the following is a full, clear, and exact description of the ingredients used in making said fluid, together with the proportions of each to be used, the manner of mixing, and directions for using the same when mixed.

My invention has for its object the production of an improved fluid for cleansing fabrics of all kinds, but more especially those in which the colors are very delicate, and cannot be cleansed by the use of common soap, as silks, ribbons, and like articles of a fine texture and finish.

To make my cleansing-fluid, I take the bulb of the plant known as soap-root, or soap-plant, (*Phalangium pomaridianum*,) which is indigenous to the Pacific coast, and beat or pound it until it is thoroughly mashed. I then press from this mass all of the juice which it contains, and to every gallon of this juice I add one ounce of borax and one ounce of sal-soda.

This forms a highly saponaceous fluid, that will not injure the texture of the most delicate fabrics or colors, and will remove the dirt equal to the strongest soap.

Other alkalies might be added to the juice of the soap-root, for preserving it, and for cleansing-purposes; but the use of a large quantity of alkaline matter would tend to destroy its quality for treating delicate fabrics.

The soap-root, in its crude state, has long been used by the Spanish and Indians on this coast as a cleansing-agent; but, when it becomes dry, it is no longer of any use, but is thrown away.

By the use of the alkalies named, I am able to preserve the cleansing-qualities of the root, and make a washing or cleansing-fluid of great value.

Having thus described my invention,

What I claim, and desire to secure by Letters Patent, is—

A washing or cleansing-fluid, composed of the ingredients named, prepared and mixed in the manner and in about the proportions above specified.

In witness whereof, I have hereunto set my hand and seal.

E. J. BALCEAR. [L. S.]

Witnesses:
 EUG. T. SAWYER,
 JNO. L. BOONE.